(12) United States Patent
Eaton et al.

(10) Patent No.: US 6,902,836 B2
(45) Date of Patent: Jun. 7, 2005

(54) ENVIRONMENTAL BARRIER COATING FOR SILICON BASED SUBSTRATES SUCH AS SILICON NITRIDE

(75) Inventors: Harry E. Eaton, Woodstock, CT (US); Shantikumar V. Nair, Sunderland, MA (US); Ellen Y. Sun, South Windsor, CT (US); Tania Bhatia, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/443,321

(22) Filed: May 22, 2003

(65) Prior Publication Data

US 2004/0234783 A1 Nov. 25, 2004

(51) Int. Cl.⁷ ................ B32B 9/04; F03B 3/12
(52) U.S. Cl. .............. 428/701; 428/446; 428/448; 428/702; 428/697; 428/698; 428/699; 428/323; 416/241 B
(58) Field of Search .................. 428/446, 448, 428/701, 702, 698, 699, 697, 323, 325, 330, 332; 416/241 B

(56) References Cited

U.S. PATENT DOCUMENTS

| | | | |
|---|---|---|---|
| 6,159,553 A | * | 12/2000 | Li et al. ............ 427/452 |
| 6,254,935 B1 | | 7/2001 | Eaton et al. |
| 6,284,325 B1 | | 9/2001 | Eaton, Jr. et al. |
| 6,296,942 B1 | | 10/2001 | Eaton, Jr. et al. |
| 6,299,988 B1 | | 10/2001 | Wang et al. |
| 6,312,763 B1 | | 11/2001 | Eaton, Jr. et al. |
| 6,352,790 B1 | | 3/2002 | Eaton et al. |
| 6,365,288 B1 | | 4/2002 | Eaton et al. |
| 6,410,148 B1 | | 6/2002 | Eaton, Jr. et al. |
| 6,541,134 B1 | * | 4/2003 | Strangman et al. ...... 428/698 |
| 2002/0025454 A1 | | 2/2002 | Wang et al. |

* cited by examiner

Primary Examiner—Jennifer McNeil
(74) Attorney, Agent, or Firm—Bachman & LaPointe, P.C.

(57) ABSTRACT

A bond layer for a silicon based substrate comprises a mixture of a first phase and a second phase, wherein the first phase is selected from the group consisting of refractory metal oxides, refractory metal silicates and mixtures thereof and the second phase is selected from the group consisting of refractory metal oxide forming metals, SiC, $Si_3N_4$, and mixtures thereof.

26 Claims, 3 Drawing Sheets

ENVIRONMENTAL BARRIER COATING FOR SILICON BASED SUBSTRATES SUCH AS SILICON NITRIDE

BACKGROUND OF THE INVENTION

The present invention is drawn to an environmental barrier coating and, more particularly, an environmental barrier coating applied to a silicon containing substrate.

Silicon based ceramics exhibit accelerated oxidation rates in high temperature, aqueous environments such as for example, the combustor and turbine sections of gas turbine engines. In order to reduce the rate of oxidation on silicon based substrates used as ceramic components in such environments, significant effort has been given to providing environment barrier coating, i.e., barrier layer(s), for the silicon based substrates so as to increase the service life of such component parts.

With reference to FIGS. 1a and 1b, prior art environmental barrier coatings form a composite 10 comprising a silicon based substrate 12, a bond coat or layer 14 which comprises a dense continuous layer of silicon metal, a barrier layer 16 which comprises either an alkaline earth aluminosilicate based on barium and strontium, or yttrium silicate or other refractory metal oxide such as, for example, aluminum oxide, and a top coat or layer 18 which comprises a refractory oxide and/or silicate, for example, zirconium oxide. In addition, an intermediate layer 20 may be provided between the 14 bond coat and the barrier 16 and/or between the barrier layer 16 and top layer 18. The intermediate layer comprises, for example, a mixture of the barrier layer material with an additional oxide such as mullite. These prior art environmental barrier systems have proved to be protective with respect to oxidation of the silicon based substrate and, in addition, adherent. However, it has now been found that certain mechanical properties of some silicon substrates, for example silicon nitride, suffer as demonstrated by a significant reduction in 4-point bend strength at room temperature. It is believed that the loss of mechanical properties results from the cracking of the bond layer adjoining the silicon containing substrate which causes stress concentrations which initiate cracks in the substrate itself. The cracks in the bond coat or layer arise from many causes including differences in the coefficient of thermal expansion between the substrate and bond layer and stresses introduced as a result of rapid cyclic cooling and heating of the component parts.

Naturally, it would be highly desirable to provide an improved bond coat layer for silicon containing substrates which do not result in significant loss of mechanical properties.

Accordingly, it is a principle object of the present invention to provide a bond coat which does not adversely affect the mechanical properties of a silicon based substrate.

SUMMARY OF THE INVENTION

The foregoing object is achieved by the present invention wherein a bond layer for a silicon based substrate comprises a mixture of a first phase and a second phase, wherein the first phase is selected from the group consisting of refractory metal oxides, refractory metal silicates and mixtures thereof and the second phase is selected from the group consisting of refractory metal oxide forming metals, SiC, $Si_3N_4$, and mixtures thereof.

There are several advantages of the invention over the prior art. First, cracking associated with a dense, continuous silicon layer is eliminated. In the prior art, cracking of the silicon layer leads to stress raisers that debit the substrate. Second, the dispersal of the refractory metal oxide former in the refractory oxide layer controls and limits the oxidation of the substrate. Third, oxidation of the dispersed metal phase in the bond layer of the invention leads to diffuse zone of oxide product throughout the thickness of the layer because not only is the oxide former dispersed throughout the layer but also because a gaseous sub-oxide can form during the oxidation process. This is advantageous compared to the prior art. In the prior art, oxidation of the silicon layer leads to the growth of a dense, continuous oxide layer on the surface of the silicon layer at the interface between the silicon layer and the adjoining layer. This growth layer is disruptive to the coating because it concentrates a set of material properties that are significantly different than the properties of the adjoining layers. The present invention diffuses the oxide growth within the thickness of the bond layer and prevents the formation of a continuous scale. Thus the gradient in properties is less and this leads to better durability.

Further objects and advantages will appear hereinbelow.

DETAILED DESCRIPTION

Figure 1A:
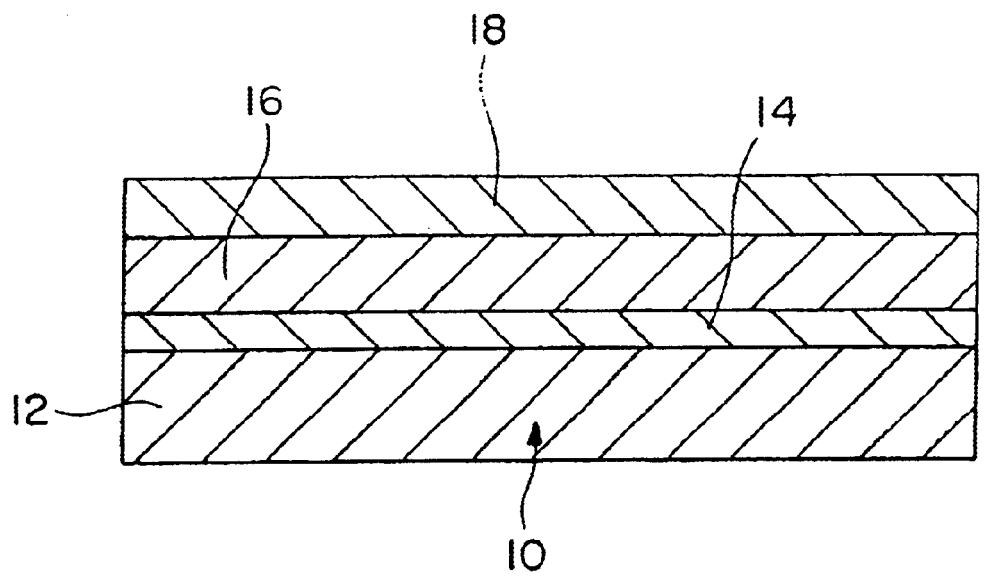
FIGS. 1a and 1b are schematic illustrations of composite articles in accordance with the prior art.
Figure 1B:
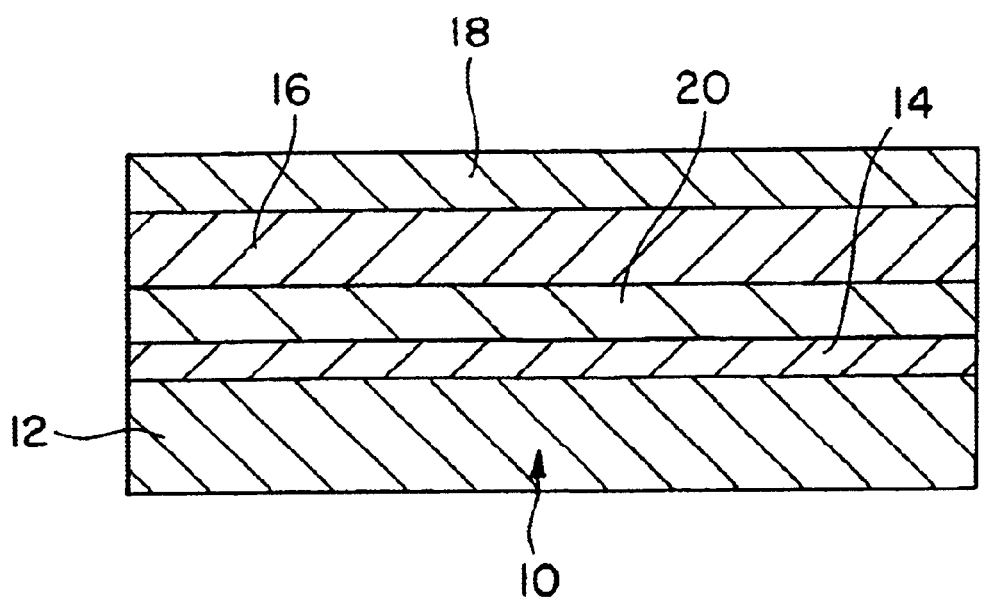
Figure 2:
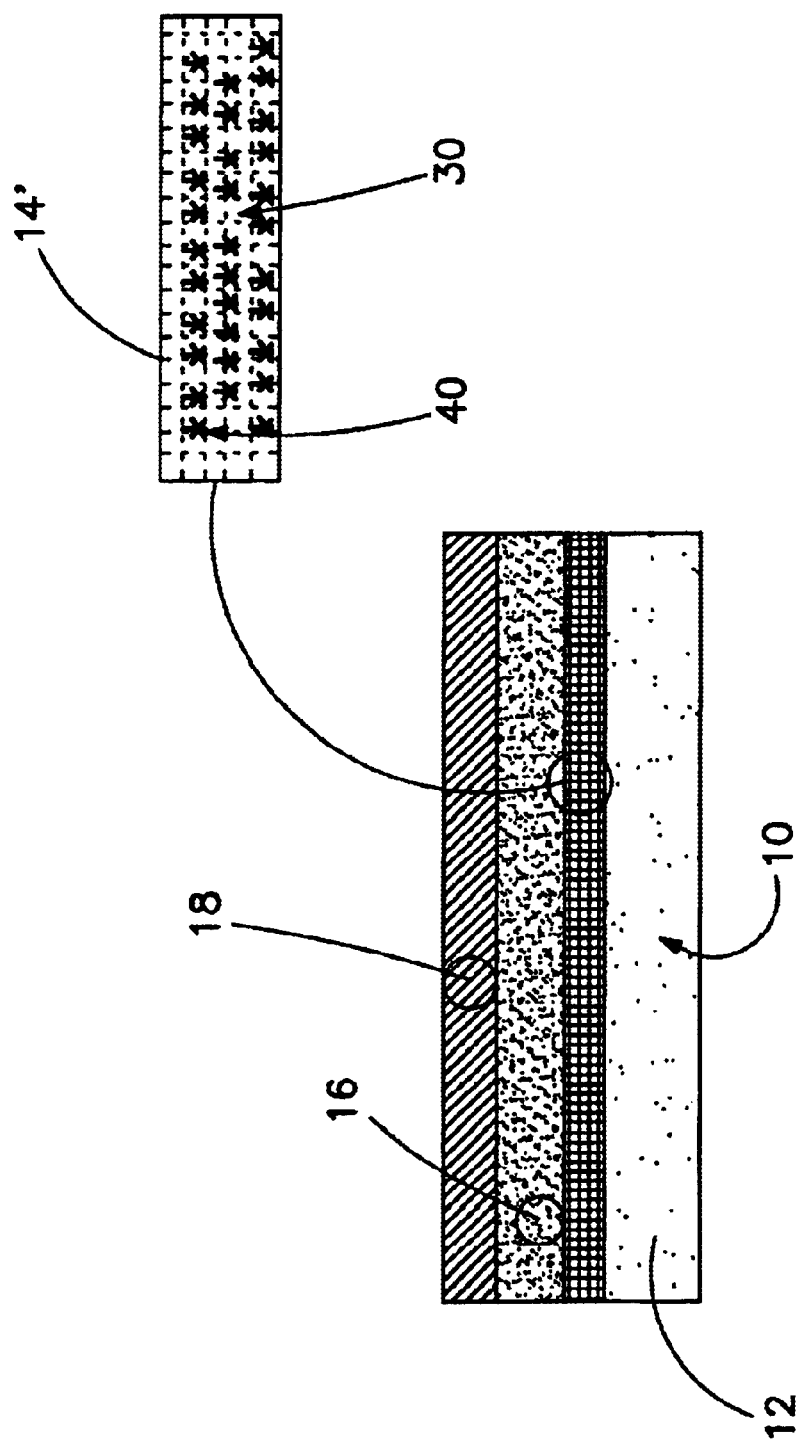
FIG. 2 is a schematic illustration of one embodiment of a composite article in accordance with the present invention.

With reference to FIG. 2, the present invention relates to an article 10 comprising a silicon base substrate 12 and a bond layer 14'. The bond layer 14' may be applied directly on the silicon base substrate or, alternatively, a silicon oxide intermediate layer or other intermediate layer may be provided between the bond layer and the silicon base substrate.

The silicon containing substrate 12 may be a silicon ceramic substrate or a silicon containing metal alloy. In a preferred embodiment, the silicon containing substrate is a silicon containing ceramic material as, for example, silicon carbide, silicon carbide composite, silicon nitride, silicon nitride composite, silicon oxynitride, silicon aluminum oxynitride and molybdenum and niobium alloys containing silicon.

In accordance with the present invention, the bond layer 14' comprises a first phase 30 and a second phase 40 wherein the first phase is selected from the group consisting of refractory metal oxides, refractory metal silicates and mixtures thereof and the second phase is selected from the group consisting of refractory metal oxide forming metals, silicon carbide, silicon nitride, and mixtures thereof. Preferably, the first phase is selected from the group consisting of oxides of chromium, silicon, tantalum, niobium, hafnium, yttrium, aluminum, zirconium, titanium, rare earth metals, alkaline earth metals; silicates of chromium, silicon, tantalum, niobium, hafnium, yttrium, aluminum, zirconium, titanium, rare earth metals, alkaline earth metals; and mixtures thereof. The second phase is preferably selected from chromium, silicon, tantalum, niobium, hafnium, yttrium, aluminum, zirconium, titanium, rare earth metals, alkaline earth metals and mixtures thereof. Niobium oxide, hafnium oxide and mixtures thereof is particularly useful as the first phase. In addition, it has been found that silicon metal is particularly useful as the second phase refractory metal oxide forming metal.

The first phase is present in an amount of between 10 to 90 volume %, preferably between 30 to 70 volume % with the balance being the second phase. The phase which is present in volume % of greater than 60 vol. % may appear as a continuous phase with the other phase appearing as discrete particulate. Thus, as shown in FIG. 2, the lower vol. % phase may be present as a dispersion of particulate material 40, that is, particles, whiskers, fibers and the like wherein the discrete particulate has a mean diameter of between 0.05 to 4.00 mils, preferably between 0.10 and 2.00 mils. In addition, it has been found that the particulate material should have a surface area to volume ratio ($cm^2/cm^3$) of greater than 3, preferably greater than 30 and ideally greater than 300. As the volume % of each phase approach 50 vol. %, there does not appear to be a continuous phase but rather a dispersion of discrete particle of both phase bond to the substrate. The particles are applied to the substrate by any known techniques, as for example, thermal spraying.

The article of the present invention may include intermediate layers such as layer 16 which forms a barrier layer or the like and further protective layers such as layer 18. Either or both of these layers may be formed as a two phase layer in accordance with the present invention as described above, that is, a first phase consisting of refractory metal oxides, refractory metal silicates and mixtures thereof and a second phase selected from refractory metal oxides forming metals, silicon carbide, silicon nitride and mixtures thereof. In addition, the intermediate layers and protective layers may comprise barrier layers known in the prior art such as, for example, those disclosed in U.S. Pat. Nos. 5,985,470, 6,296,941, 6,296,942, 6,352,790, and 6,387,456. In addition, any of these layers may be provided with a coefficient of thermal expansion modifier to adjust the coefficient of thermal expansion of the layer to that of adjacent layers. Such a coefficient of thermal expansion modifier (CTE) is disclosed in U.S. patent application Ser. No. 10/034,677 filed Dec. 19, 2001 which is incorporated herein by reference. The modifier is niobium oxide.

The advantage of the article of the present invention will become clear from consideration of the following example.

EXAMPLE

Figure 3:
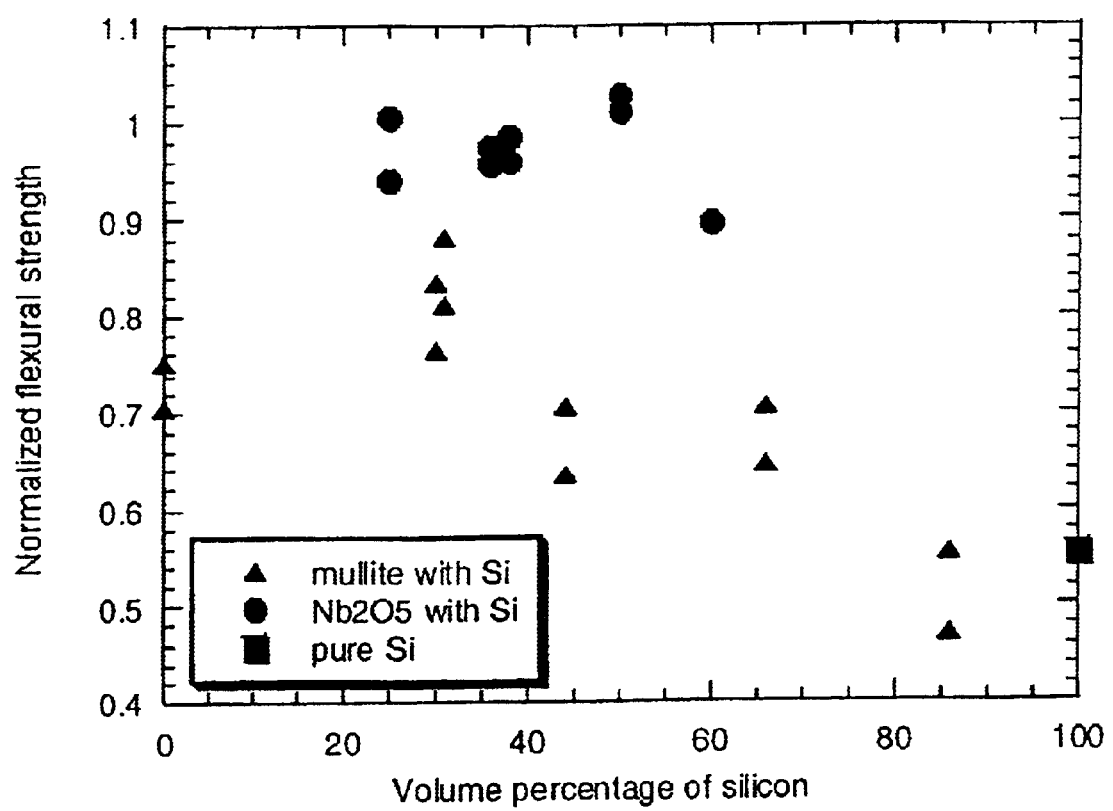
FIG. 3 summarizes 4-point bond test results showing the affect of the bond coat of the present invention.

Coatings of the bond layer were fabricated onto coupons of silicon nitride using standard thermal spray techniques. The coating powders were prepared by spray drying the ingredients to agglomerate them as suitable thermal spray powders. Thermal spraying was accomplished using argon/hydrogen thermal spray arc gases at approximately 30 kw power level. The silicon nitride substrate coupons were sized according to ASTM C 1164-94 which is a 4-pt. bend bar test description used to measure conventional 4-pt. bend strength of materials. Approximately 125 microns (5 mils) of the bond layer coatings were deposited each time onto the substrate. Accordingly, a series of bond layer coatings were fabricated onto the silicon nitride. These coatings were examples of mixtures of the first and second phases of the present invention and for the specific example consisted of silicon metal as the second phase in a first phase of either mullite or niobium oxide. FIG. 3 shows the 4-pt. bend strength testing results. With no first phase present, i.e., only silicon present in the coating, the bend strength of the silicon nitride is reduced approximately 50% in comparison to the uncoated silicon nitride substrate bend strength. However, as the second phase content is reduced by adding more and more of the first phase, either mullite or niobium oxide, the bend strength increases significantly and even approaches the original uncoated bend strength of the silicon nitride.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An article comprising a silicon based substrate and a bond layer, the bond layer comprises a first phase and a second phase, wherein the first phase is selected from the group consisting of refractory metal oxides, refractory metal silicates and mixtures thereof and the second phase is a refractory metal oxide forming metal selected from the group consisting of chromium, silicon, tantalum, niobium, hafnium, yttrium, aluminum, zirconium, titanium, rare earth metals, alkaline earth metals and mixtures thereof.

2. An article comprising a silicon based substrate and a bond layer, the bond layer comprises a first phase and a second phase, wherein the first phase comprises a constituent selected from the group consisting of niobium oxide, hafnium oxide and mixtures thereof and the second phase comprises a constituent selected from the group consisting of refractory metal oxide forming metals, SiC, $Si_3N_4$, and mixtures thereof.

3. An article comprising a silicon based substrate; a bond layer, and at least one intermediate layer between the substrate and the bond layer, the bond layer comprises a first phase and a second phase, wherein the first phase comprises a constituent selected from the group consisting of refractory metal oxides, refractory metal silicates and mixtures thereof and the second phase comprises a constituent selected from the group consisting of refractory metal oxide forming metals, SiC, $Si_3N_4$, and mixtures thereof.

4. An article according to claim 1 or 3, wherein the first phase is selected from the group consisting of oxides of chromium, silicon, tantalum, niobium, hafnium, yttrium, aluminum, zirconium, titanium, rare earth metals, alkaline earth metals; silicates of chromium, silicon, tantalum, niobium, hafnium, yttrium, aluminum, zirconium, titanium, rare earth metals, alkaline earth metals; and mixtures thereof.

5. An article according to claim 1, 2 or 3, wherein the first phase comprises a substantially continuous phase.

6. An article according to claim 1, 2 or 3, wherein the second phase comprises discrete particulate.

7. An article according to claim 6, wherein the particulate have a surface area to volume ratio ($cm^2/cm^3$) of greater than 3.

8. An article according to claim 6, wherein the particulate have a surface area to volume ratio ($cm^2/cm^3$) of greater than 30.

9. An article according to claim 6, wherein the particulate have a surface area to volume ratio ($cm^2/cm^3$) of greater than 300.

10. An article according to claim 6, wherein the particulate have a mean diameter of between 0.05 to 4.00 mils.

11. An article according to claim 6, wherein the particulate have a mean diameter of between 0.10 to 2.00 mils.

12. An article according to claim 1, 2 or 3, wherein the first phase comprises discrete particulate dispersed in the second phase.

13. An article according to claim 1, 2 or 3, wherein the first phase is selected form the group consisting of niobium oxide, hafnium oxide and mixtures thereof.

14. An article according to claim 13, wherein the second phase is silicon.

15. An article according to claim 1, 2 or 3, wherein the second phase is silicon.

16. An article according to claim 1, 2 or 3, further including a protective layer, wherein the protective layer comprises a first phase and a second phase, wherein the first phase is selected from the group consisting of refractory metal oxides, refractory metal silicates and mixtures thereof and the second phase is selected from the group consisting of refractory metal oxide forming metals, SiC, $Si_3N_4$, and mixtures thereof.

17. An article according to claim 16, wherein at least one intermediate layer is provided between the bond layer and the protective layer.

18. An article according to claim 17, wherein a top layer is provided on the protective layer.

19. An article according to claim 18, wherein the top layer includes a coefficient of thermal expansion (CTE) modifier.

20. An article according to claim 19, wherein the CTE modifier is niobium oxide.

21. An article according to claim 1, 2 or 3, wherein the bond layer is directly applied to the silicon based substrate.

22. An article according to claim 1, 2 or 3, wherein at least one intermediate layer is between the silicon based substrate and the bond layer.

23. An article according to claim 1, 2 or 3, wherein the silicon based substrate is silicon nitride.

24. An article according to claim 1, 2 or 3, wherein the first phase is present in an amount of between 10 to 90 vol. %, balance second phase.

25. An article according to claim 1, 2 or 3, wherein the first phase is present in an amount of between 30 to 70 vol. %, balance second phase.

26. An article according to claim 2, wherein the second phase is selected from the group consisting of chromium, silicon, tantalum, niobium, hafnium, yttrium, aluminum, zirconium, titanium, rare earth metals, alkaline earth metals and mixtures thereof.

* * * * *

UNITED STATES PATENT AND TRADEMARK OFFICE
CERTIFICATE OF CORRECTION

PATENT NO. : 6,902,836 B2
DATED : June 7, 2005
INVENTOR(S) : Eaton et al.

It is certified that error appears in the above-identified patent and that said Letters Patent is hereby corrected as shown below:

Column 5,
Line 1, "2" should be deleted.

Column 13,
Line 2, the word "form" should be -- from --.

Signed and Sealed this

Twenty-ninth Day of November, 2005

JON W. DUDAS
*Director of the United States Patent and Trademark Office*